(12) United States Patent
Zheng et al.

(10) Patent No.: US 11,272,029 B2
(45) Date of Patent: Mar. 8, 2022

(54) ACCESS LOG PROCESSING METHOD AND DEVICE

(71) Applicant: Wangsu Science & Technology Co., Ltd., Shanghai (CN)

(72) Inventors: Jiajiang Zheng, Shanghai (CA); Baobei Zheng, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 46 days.

(21) Appl. No.: 17/037,555

(22) Filed: Sep. 29, 2020

(65) Prior Publication Data

US 2021/0037111 A1 Feb. 4, 2021

Related U.S. Application Data

(63) Continuation of application No. PCT/CN2020/074955, filed on Feb. 12, 2020.

(30) Foreign Application Priority Data

Jul. 24, 2019 (CN) .......................... 201910673499.5

(51) Int. Cl.
*G06F 15/16* (2006.01)
*H04L 67/568* (2022.01)
(Continued)

(52) U.S. Cl.
CPC ...... *H04L 67/2842* (2013.01); *G06F 9/45558* (2013.01); *H04L 61/1511* (2013.01);
(Continued)

(58) Field of Classification Search
CPC ............. H04L 67/2842; H04L 61/1511; H04L 67/1021; H04L 67/1097; H04L 67/06;
(Continued)

(56) References Cited

U.S. PATENT DOCUMENTS 6,101,508 A * 8/2000 Wolff .......................... G06F 9/52
709/223
9,420,050 B1 8/2016 Sakata et al.
(Continued)

FOREIGN PATENT DOCUMENTS

CN 101621426 A 1/2010
CN 101848137 A 9/2010
(Continued)

OTHER PUBLICATIONS

Wangsu Science & Technology Co., Ltd., Extended European Search Report, EP20775564.6, dated May 21, 2021, 8 pgs.
(Continued)

*Primary Examiner* — John B Walsh
(74) *Attorney, Agent, or Firm* — USCH Law, PC

(57) ABSTRACT

The present disclosure provides an access log processing method and an access log processing device. In some embodiments, a cache server divides virtual nodes to which each access server is mapped into groups according to domain name weight information of a first domain name, determines a first virtual node corresponding to the first domain name in each group, determines a first access server corresponding to each first virtual node according to node configuration information, and sends access logs of the first domain name to the first access server. This technical solution ensures effective processing of access logs in case of high traffic.

15 Claims, 6 Drawing Sheets

(51) Int. Cl.
*G06F 9/455* (2018.01)
*H04L 61/4511* (2022.01)
*H04L 67/1021* (2022.01)
*H04L 67/1097* (2022.01)

(52) U.S. Cl.
CPC ...... *H04L 67/1021* (2013.01); *H04L 67/1097* (2013.01); *G06F 2009/45595* (2013.01)

(58) Field of Classification Search
CPC . H04L 67/1031; H04L 67/1023; H04L 69/40; H04L 63/102; H04L 63/104; H04L 67/32; G06F 9/45558; G06F 2009/45595
See application file for complete search history.

(56) References Cited

U.S. PATENT DOCUMENTS

| | | | |
|---|---|---|---|
| 10,303,533 B1 | 5/2019 | Panov et al. | |
| 2009/0144404 A1* | 6/2009 | Wolman | G06F 9/5033 709/223 |
| 2012/0290693 A1* | 11/2012 | Karasaridis | H04L 61/1511 709/222 |
| 2014/0067914 A1 | 3/2014 | Nishii | |
| 2018/0157521 A1* | 6/2018 | Arikatla | G06F 9/45558 |

FOREIGN PATENT DOCUMENTS

| | | | |
|---|---|---|---|
| CN | 102638483 | A | 8/2012 |
| CN | 102724063 | A | 10/2012 |
| CN | 103414608 | A | 11/2013 |
| CN | 103905503 | A | 7/2014 |
| CN | 105721532 | A | 6/2016 |
| CN | 108551444 | A | 9/2018 |
| CN | 108551474 | A | 9/2018 |
| CN | 108881509 | A | 11/2018 |
| CN | 109104327 | A | 12/2018 |
| CN | 109167840 | A | 1/2019 |
| CN | 109951338 | A | 6/2019 |
| CN | 110401657 | A | 11/2019 |
| WO | WO 2016173451 | A1 | 11/2016 |

OTHER PUBLICATIONS

Ba, Zi-yan et al., "The Optimization for Consistent Hash Based on Virtual Node," Journal, *Software*, 2014, vol. 35(Issue 12): 26-29, Beijing, China.

Wangsu Science & Technology Co., Ltd., International Search Report, PCT/CN2020/074955, dated Nov. 5, 2020, 4 pgs.

Wangsu Science & Technology Co., Ltd., First Office Action (CN), CN201910673499.5, dated Apr. 2, 2020, 7 pgs.

Wangsu Science & Technology Co., Ltd., Second Office Action (CN), CN201910673499.5, dated Jul. 3, 2020, 5 pgs.

Wangsu Science & Technology Co , Ltd., Final Office Action (CN), CN201910673499.5, dated Jul. 28, 2020, 4 pgs.

* cited by examiner

ACCESS LOG PROCESSING METHOD AND DEVICE

CROSS REFERENCE TO RELATED APPLICATIONS

The present application is a continuation of PCT Application No. PCT/CN2020/074955, entitled "Access Log Processing Method and Device," filed Feb. 12, 2020, which claims priority to Chinese Patent Application No. 201910673499.5, entitled "Access Log Processing Method and Device," filed Jul. 24, 2019, each of which is incorporated herein by reference in its entirety.

TECHNICAL FIELD

The present disclosure relates to the field of computer technology, and particularly, to an access log processing method and an access log processing device.

BACKGROUND

The continuous development of internet technology and media files has brought great convenience to people's lives and work. In order to improve the speed of accessing the Internet by users, a commonly used caching technology is CDN (Content Delivery Network) at present. As a new type of network content service system, a CDN network is built based on the IP (Internet Protocol) network and provides content distribution and services based on the efficiency requirements, quality requirements and content order of content access and application. For example, a customer's domain name is "www.xxxxxx.net", and a CDN server provides the customer with access to the domain name so that users can normally acquire access response when accessing "www.xxxxxx.net". The CDN network represents a network application service model that is built based on the network and is featured with high-quality, high-efficiency and distinct network order.

With the development of CDN network, it becomes increasingly important to ensure the service quality of the CDN network. For this purpose, data analysis may be performed on the access logs of each domain name (channel) to ensure effective services for customers. However, at present, the number of the CDN server has reached the order of magnitude of 100,000, and the traffic per second is as high as 20-50 million. It is often difficult for a data processing center to handle direct processing of such a large number of access logs, and processing would be delayed a lot to affect the speed.

Therefore, there is an urgent need for a access log processing method, so as to ensure effective processing of access logs in the case of high traffic.

SUMMARY

Some embodiments of the present disclosure provides an access log processing method and an access log processing device to ensure effective processing of access logs in the case of high traffic.

In some embodiments, an access log processing method is provided, including:

dividing, by a cache server, virtual nodes to which each access server is mapped, into groups according to domain name weight information of a first domain name;

determining, by the cache server, a first virtual node corresponding to the first domain name in each group;

determining, by the cache server, a first access server corresponding to each first virtual node according to node configuration information, the node configuration information being configured to indicate correspondence between virtual nodes and access servers; and sending, by the cache server, access logs of the first domain name to the first access server.

In the aforementioned technical solution, by dividing the virtual nodes into groups and determining the corresponding first virtual node in each group according to the domain name weight information of the first domain name, it is achieved that an appropriate number of virtual nodes are allocated to the first domain name according to the number of the historical access logs. Meanwhile, by dividing the virtual nodes into groups, effective group management is achieved. The access servers are mapped into corresponding virtual nodes according to the processing capabilities of the access servers, that is, a certain access server is mapped into more virtual nodes when the access server has a high processing capability, or is mapped into less virtual nodes when the access server has a low processing capacity, such that equalization of the access server when processing the access logs is achieved, and effective processing of the access logs is ensured even in the case of high traffic.

In some embodiments, the cache server determines a second virtual node when determining that the first access server is highly loaded, and the second virtual node and the first virtual node belong to the same group and are adjacent to each other.

The cache server distributes a part of the access logs of the first domain name to a second access server corresponding to the second virtual node.

In the aforementioned technical solution, in consideration of the load status of the first access server, the second access server is added to process the access logs of the first domain name, thereby further ensuring equalized and effective processing of the access logs of the first domain name. Meanwhile, it can be seen that coordination is performed only in the same group, which is convenient for management of the virtual nodes.

In some embodiments, the cache server determines a second virtual node when determining that the first access server fails, and the second virtual node and the first virtual node belong to the same group and are adjacent to each other.

The cache server distributes the access logs of the first domain name to the second access server corresponding to the second virtual node.

In the aforementioned technical solution, in consideration of the failure condition of the first access server, the second access server is added to process the access logs of the first domain name, thereby further ensuring timely and effective processing of the access logs of the first domain name.

In some embodiments, before dividing the virtual nodes to which each access server is mapped into groups, the method further includes:

receiving, by the cache server, the node configuration information and the domain name weight information sent from a scheduling server, the node configuration information being created by the scheduling server according to a consistent hash ring; and the virtual nodes in the consistent hash ring being determined according to processing capability of each access server.

In the aforementioned technical solution, the scheduling server is introduced to determine the node configuration information and the domain name weight information and achieve real-time dynamic adjustment, so as to dynamically adjust the access server corresponding to the access logs of each domain name to achieve dynamic equalization of the load in real time.

In some embodiments, a access log processing method is provided, including:

receiving, by a first access server, access logs of a first domain name sent from a cache server, the first access server being determined by the cache server according to domain name weight information of the first domain name and node configuration information, the node configuration information being configured to indicate the correspondence between virtual nodes and access servers; and processing, by the first access server, the received access logs of the first domain name and sending the processed access logs.

In the aforementioned technical solution, on one hand, the access server may only process the access logs of the same domain name or a few domain names in a short period of time, and on the other hand, equalization processing of the access logs between various access servers is achieved.

In some embodiments, the processing, by the first access server, the received access logs of the first domain name and sending the processed access logs includes:

merging, by the first access server, the received access logs of the first domain name into one log according to the domain name and sending the merged log.

In the aforementioned technical solution, by merging multiple access logs into one log, processing of the access logs by the access server is more concise and flexible.

In some embodiments, an access log processing device is provided, including:

a processing unit, configured to divide virtual nodes to which each access server is mapped into groups according to domain name weight information of a first domain name, the first domain name being any one of a plurality of domain names, wherein the processing unit is further configured to determine a first virtual node corresponding to the first domain name in each group, and the processing unit is further configured to determine a first access server corresponding to each first virtual node according to node configuration information, the node configuration information being configured to indicate correspondence between virtual nodes and access servers; and a sending unit, configured to send access logs of the first domain name to the first access server.

In some embodiments, an access log processing device is provided, including:

a receiving unit configured to receive access logs of a first domain name sent from a cache server, the receiving unit being determined by the cache server according to domain name weight information of the first domain name and node configuration information, the node configuration information being configured to indicate a corresponding relationship between virtual nodes and access servers; and a processing unit configured to process the received access logs of the first domain name and send the processed access logs.

In some embodiments, a computing device is provided, including:

a memory configured to store program instructions;

a processor configured to call the program instructions stored in the memory, and perform any one of the aforementioned methods based on the program instructions.

In some embodiments, a computer-readable non-volatile storage medium is provided, including computer-readable instructions, and the computer-readable instructions, when read and executed by a computer, causes the computer to perform any one of the aforementioned methods.

DETAILED DESCRIPTION

In order to clarify the objective, the technical solutions and the advantages of the present disclosure, the present disclosure will be further described in details with reference to the accompany drawings. The specific operation methods in the method embodiments may also be applicable to the device embodiments or the system embodiments. In the description of the present disclosure, "multiple" or "a plurality of" refers to two or more unless otherwise stated.

Figure 1:
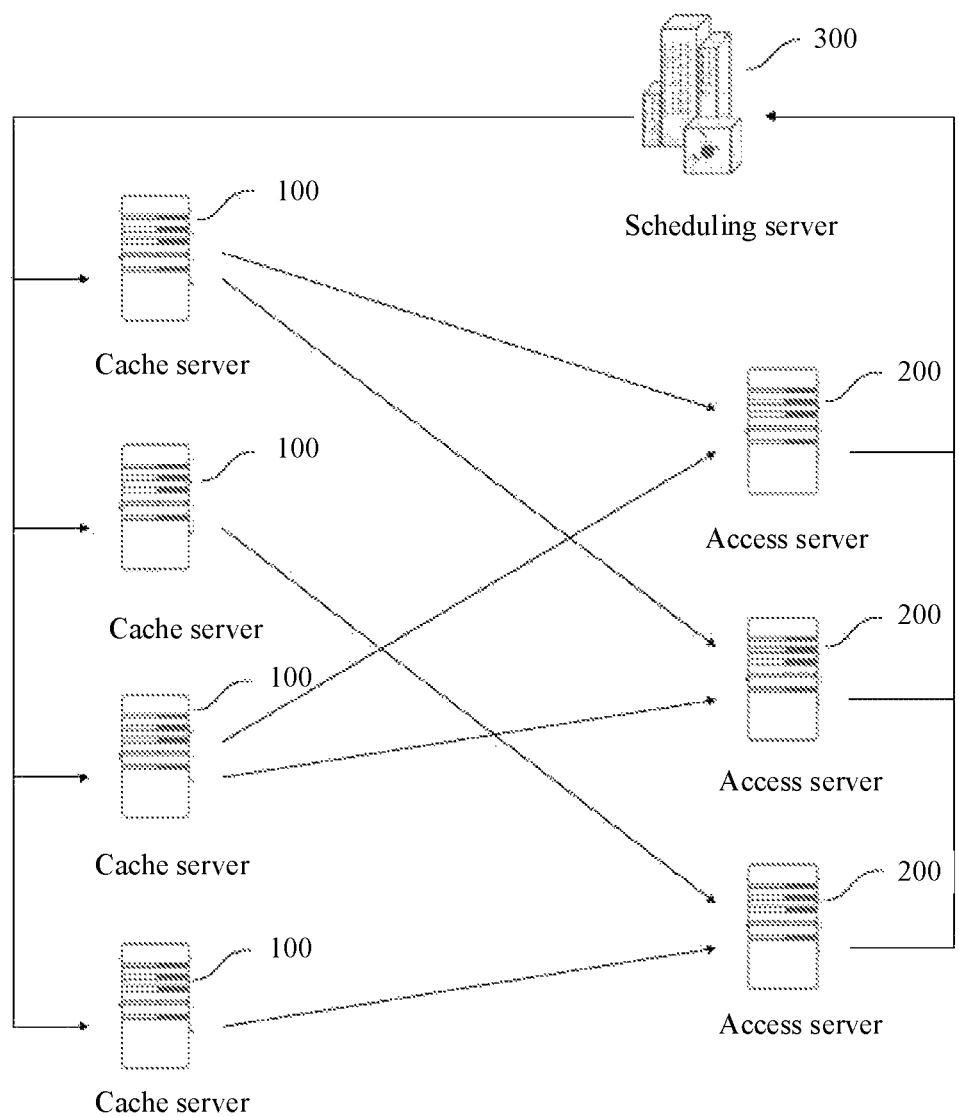
FIG. 1 is a schematic diagram of a possible network architecture according to the present disclosure.

FIG. 1 exemplarily illustrates a system architecture to which a CDN access log processing method is applicable provided by embodiments of the present disclosure. The system architecture may include cache servers 100, access servers 200, and a scheduling server 300.

The cache servers 100 may be edge servers when users access a domain name. For example, the cache servers 100 provide access service for the domain name "www.xxxxxx.net", and when users access the domain name "www.xxxxxx.net", access requests are dispatched to the cache servers 100 to provide access responses to the users. The cache servers 100 record access logs of the users according to the domain name, and then distribute the access logs to the access servers 200 through a function similar to the collection unit. The access servers 200 are configured to acquire the access logs from the cache servers 100, process the acquired access logs and then send the processed access logs. The processing of the access logs by the access servers 200 may include summarizing different statistical items according to the domain name, for example, visit times, traffic, and Top Access URL (Uniform Resource Locator) ranking. There are multiple access servers 200, and which access servers the cache servers 100 send the access logs to is determined by the scheduling server 300. That is, the scheduling server 300 is configured to determine the access servers 200 corresponding to the access logs on the cache servers 100, so as to better coordinate the relationship between the cache servers 100 and the access servers 200.

Figure 2:
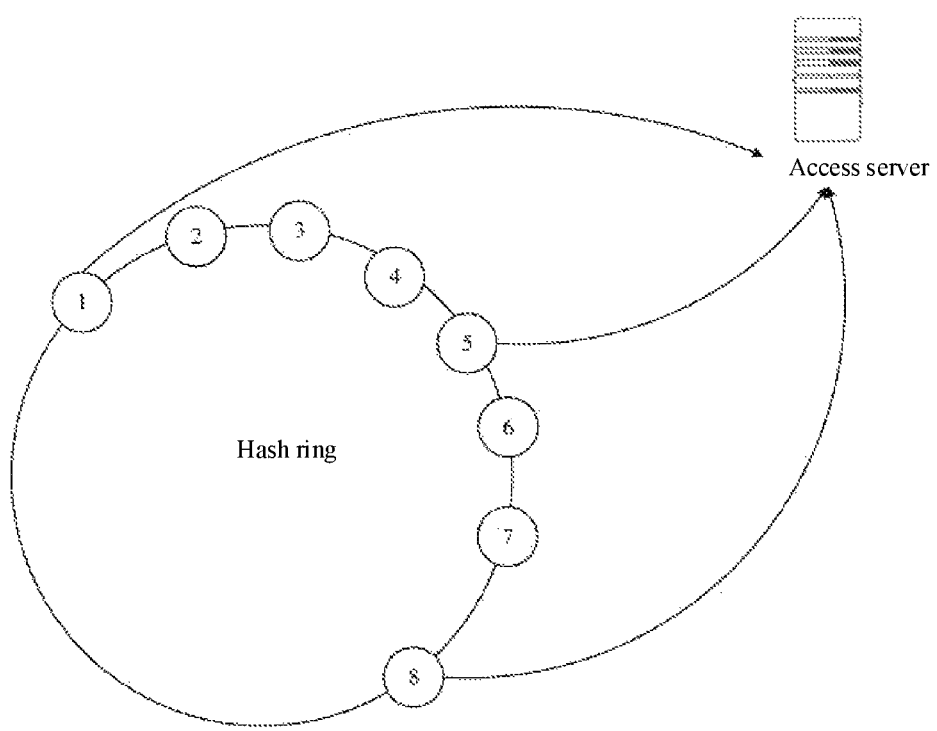
FIG. 2 is a schematic diagram of a distribution result of virtual nodes according to the present disclosure.

Aiming at how to determine, by the scheduling server 300, the corresponding access servers 200 for the cache servers 100, a feasible method is provided by the embodiments of the present disclosure. Specifically, the scheduling server 300 maps the access servers 200 to a plurality of virtual nodes according to the processing capability of each access server 200 or the working status of each access server 200 or other factors to be considered. In general, the number of the virtual nodes is much greater than the number of the access servers 200, i.e., one access server 200 may be mapped to multiple virtual nodes. The scheduling server 300 determines the correspondence between the virtual nodes and the access servers 200 to form node configuration information. In order to achieve equalization processing for the access logs of each domain name by the access server 200, the scheduling server 300 maps the virtual nodes to a hash ring. The distribution of the virtual nodes in the hash ring may be in various forms, for example, the virtual nodes of the same access server 200 are relatively concentrated in a certain area of the hash ring; or the virtual nodes of the same access server 200 are distributed relatively uniformly on the hash ring. The embodiments of the present disclosure perform hash calculation on the virtual nodes corresponding to the same access server 200. Specifically, the value of each virtual node corresponding to the same access server 200 may be set as an IP or MAC address of the access server 200 plus a serial number; hash calculation is performed on the value of the virtual node to determine the distribution of the virtual nodes corresponding to the access server 200 on the hash ring and the distribution result are shown in FIG. 2. Hash ring in the aforementioned implementation process is merely a certain way to achieve equalization processing, and other equalization algorithms may be applicable to the present solution.

For example, the node configuration information may be as shown in Table 1. Among them, the virtual node number represents the position of the virtual node on the hash ring, and the virtual node number increases sequentially in a clockwise direction on the hash ring. It can be seen from FIG. 2 that the virtual nodes corresponding to the same access server 200 is distributed on the hash ring in a substantially uniform manner.

TABLE 1

| Access Server | Virtual Node No. |
|---|---|
| 192.168.0.1 | 1 |
| | 4 |
| | 8 |
| 192.168.0.2 | 2 |
| | 5 |
| 192.168.0.3 | 3 |
| | 6 |
| | 10 |
| ... | |

Figure 3:
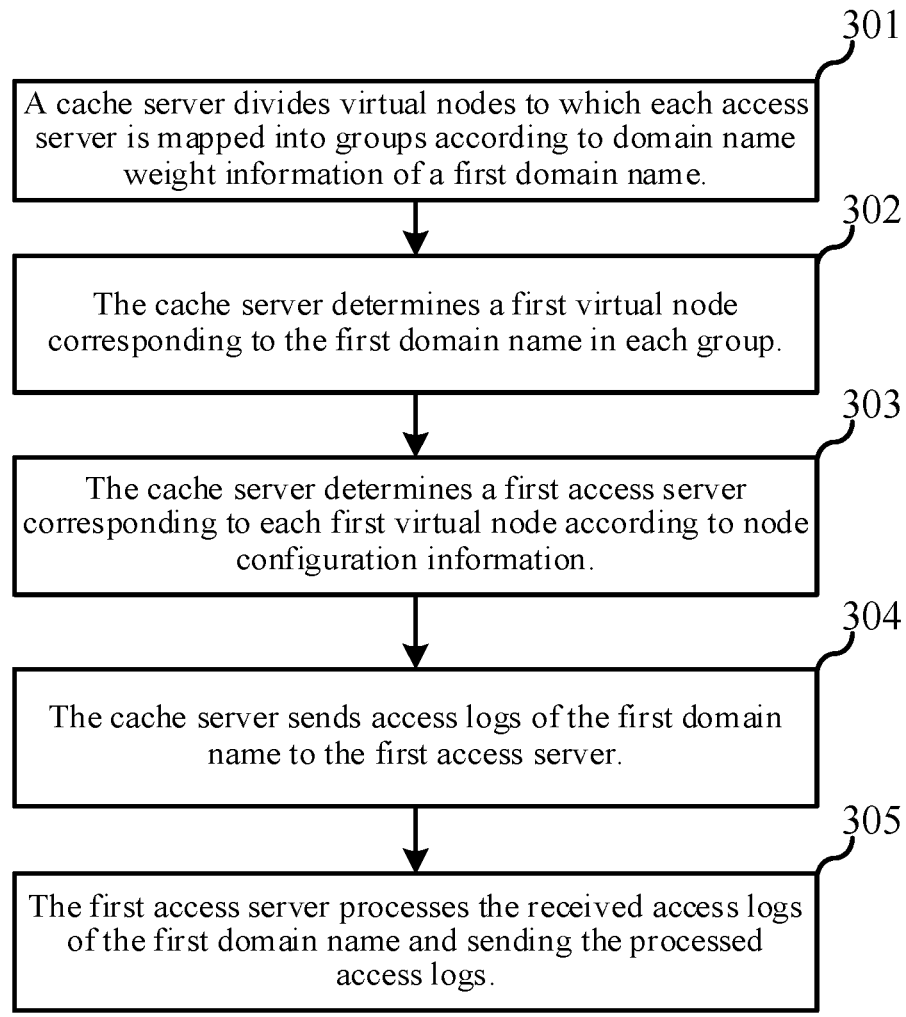
FIG. 3 is a schematic flowchart of processing access logs according to the present disclosure.

Based on the aforementioned description, FIG. 3 exemplarily shows the process of a access log processing method provided by the embodiments of the present disclosure. The process may be processed by the cache servers 100, or may be processed by functional units included in the cache servers 100.

In step 301, a cache server divides virtual nodes to which each access server is mapped into groups according to domain name weight information of a first domain name.

The first domain name may be any one of a plurality of domain names processed by the cache server. The cache server may perform the same or different operation on all the domain names processed by the cache server. For example, some of the domain names adopt the existing technology, and some adopt the method according to the embodiments of the present disclosure.

The domain name weight information may be determined according to preset priority of each domain name. For example, as the priority of each domain name is different, it is necessary to pay special attention to the access logs of the domain name with a higher priority, and the domain name with a higher priority may be set with high domain name weight. The domain name weight information may also be determined according to the number of historical access logs of each domain name. For example, the greater the number of historical access logs is, the greater the number of access servers allocated to it is, thereby achieving efficient processing of the access logs. Specifically, it may be determined by the scheduling server 300 according to the statistics of historical access logs. For example, according to the historical data, the peak value of the first domain name is the average number Q of logs per second (unit: tps). If the business index for processing access logs is: processing 1000 access logs of the first domain name in t seconds, then the domain name weight information allocated for the first domain name is $t*Q/1000$, which indicates that such a number of virtual nodes are required to process the access logs of this domain name, thus the virtual nodes need to be divided into $t*Q/1000$ groups.

In step 302, the cache server determines a first virtual node corresponding to the first domain name in each group. Specifically, the number of the virtual nodes included in each group is determined according to the total number of the virtual nodes and the number of the groups; and hash calculation is performed on the first domain name according to the number of the virtual nodes included in each group to obtain the location of the first virtual node corresponding to the first domain name in each group.

In some embodiments, in step 301, the virtual nodes are divided into groups according to the domain name weight information of the first domain name. Specifically, for example, if the weight (m) of the first domain name is 5, and the number (n) of the virtual nodes corresponding to all the access servers is 100, all the virtual nodes are divided into 5 groups, and the number (g) of the virtual nodes in each group is 20. For example, the virtual nodes included in the first group are numbered from 1 to 20, and the virtual nodes in the second group are numbered from 21-40, and so on. A group is used as a unit, and a first virtual node is determined in each group. In this way, equalization of the first domain name in the virtual nodes is achieved, and meanwhile management of the virtual nodes is facilitated by taking the virtual nodes as groups. A feasible way to determine the first virtual node in each group is to perform hash calculation for the domain name. That is, the position in the first group is $P1=\text{hash (first domain name)}\% g$, specifically, for example, $P1=\text{hash (first domain name)}\% 20$, the position in the second group is $P2=P1+20$, the position in the third group is $P3=P2+20$, the position in the fourth group is $P4=P3+20$, the position in the fifth group is $P5=P4+20$, and the corresponding position of the first virtual node in each group is from P1 to P5, respectively. Thus, it can be seen that the relative positions of the virtual nodes corresponding to the same domain name in the respective groups should be the same.

In step 303, the cache server determines a first access server corresponding to each first virtual node according to node configuration information.

The node configuration information is configured to indicate the correspondence between the virtual nodes and the access servers.

In step 304, the cache server sends access logs of the first domain name to the first access server.

In step 305, the first access server processes the received access logs of the first domain name and sends them.

The access logs stored in the cache server are usually discrete, as follows:

[1, channel-a, url, size, status, other_field]
[2, channel-b, url, size, status, other_field]
[3, channel-c, url, size, status, other_field]
...
[n, channel-x, url, size, status, other_field]

It can be seen that the access logs listed above are arranged in the order that the logs are generated, and each log occupies one line during data processing. Therefore, the access server needs to filter or sort the received access logs, and more resources may be occupied when processing multiple rows of data. In the aforementioned manner, the virtual nodes corresponding to each access server are basically evenly distributed in each group, and meanwhile the relative positions of the virtual nodes corresponding to the same domain name in the respective groups are the same, so that the logs of the same domain name are basically distributed on the same access server or a few access servers, which improves the processing efficiency of the access server. Of course, due to the different processing capabilities of the access servers, the virtual nodes corresponding to the access server may not be evenly distributed in practice, but through the aforementioned embodiments, the equalization of access server distribution and the uniqueness of access log processing may still be achieved to a certain extent.

In the aforementioned implementation process, the virtual nodes is divided into groups according to the domain name weight information of the first domain name, thus realizing the allocation of an appropriate number of virtual nodes for the first domain name according to the number of the historical access logs, and ensuring the timely processing of the access logs. Meanwhile, the virtual nodes corresponding to the access server are uniformly distributed in the groups through the correspondence between the virtual nodes and the access server; by determining the virtual nodes according to the first domain name, the equalization and uniqueness of processing of access logs by the access server are realized, so that the access server is able to effectively process the access logs.

Figure 4:
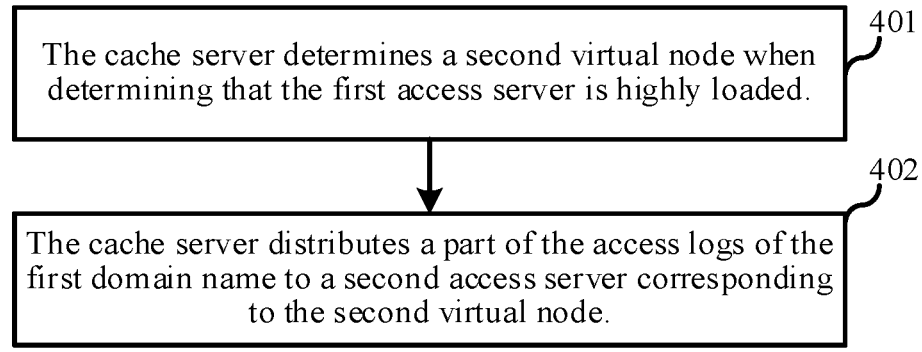
FIG. 4 is a schematic flowchart of processing access logs when the access server is under a high load according to the present disclosure.

In implementation of the aforementioned embodiments, the data volume of the access logs of the first domain name may increase rapidly in a short time, and estimation based on the historical access logs may be inaccurate. In this regard, a possible implementation is provided according to the embodiments of the present disclosure, as shown in FIG. 4.

In step 401, the cache server determines a second virtual node when determining that the first access server is highly loaded. The second virtual node is adjacent to the first virtual node of the group.

In step 402, the cache server distributes a part of the access logs of the first domain name to a second access server corresponding to the second virtual node.

Specifically, in step 401, the working status of the first access server may be notified to the cache server by the first access server, or notified to the cache server by the scheduling server. The working status of the first access server may be determined according to information such as the current CPU usage and IO usage.

The second virtual node is usually a next node to the first virtual node on the hash ring; if the next node also corresponds to the first access server, a further next node is determined until the virtual node that it is not corresponding to the first access server is found. In the embodiments of the present disclosure, it is possible to realize that adjacent virtual nodes correspond to different access servers through reasonable setting of the node configuration information. As shown in Table 1, the virtual nodes corresponding to each access server are evenly distributed in each group, such that the second access server may be quickly determined.

In step 402, the cache server may determine which access logs of the first domain name are distributed to the second access server corresponding to the second virtual node through settings of the cache server. For example, the cache server distributes the access logs to the first virtual node and the second virtual node by turns.

Figure 5:
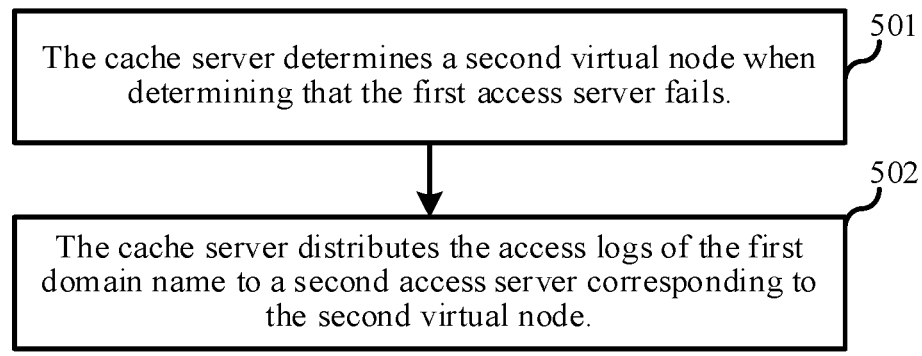
FIG. 5 is a schematic flowchart of processing access logs when the access server is in a failure according to the present disclosure.

In implementation of the aforementioned embodiments, the first access server may fail during processing the access logs of the first domain name, In this regard, a possible implementation is provided according to the embodiments of the present disclosure, as shown in FIG. 5.

In step 501, the cache server determines a second virtual node when determining that the first access server fails. The second virtual node is adjacent to the first virtual node of the group.

In step 502, the cache server distributes the access logs of the first domain name to the second access server corresponding to the second virtual node.

The implementation process described in FIG. 5 is basically similar to that in FIG. 4 and will not be described in details herein.

In the aforementioned implementation process, when different conditions occur on the access server, the access server to be replaced or shared may be quickly determined by grouping, thereby further ensuring effective equalization processing of the access logs.

In order to speed up the processing of the access logs by the access server, in the aforementioned embodiments, although the access logs are differentiated by domain name, there are multiple access logs for the same domain name. When multiple data are processed, such as inserting a message queue, more resources are occupied. Therefore, in the embodiments of the present disclosure, the access server merges the received access logs, that is, the received access logs of the first domain name are merged into one log, which may be represented as follows:

channel-a : {
[1, channel-a, url, size, status, other_field],
[4, channel-a, url, size, status, other_field]
}
channel-b : {
[2, channel-b, url, size, status, other_field],
[5, channel-b, url, size, status, other_field],
[6, channel-b, url, size, status, other_field]
}

Generally, the access server processes the received access logs to a certain extent, and then sends the processed access logs to the downstream device, so that the downstream device further processes the access logs that have been merged.

Figure 6:
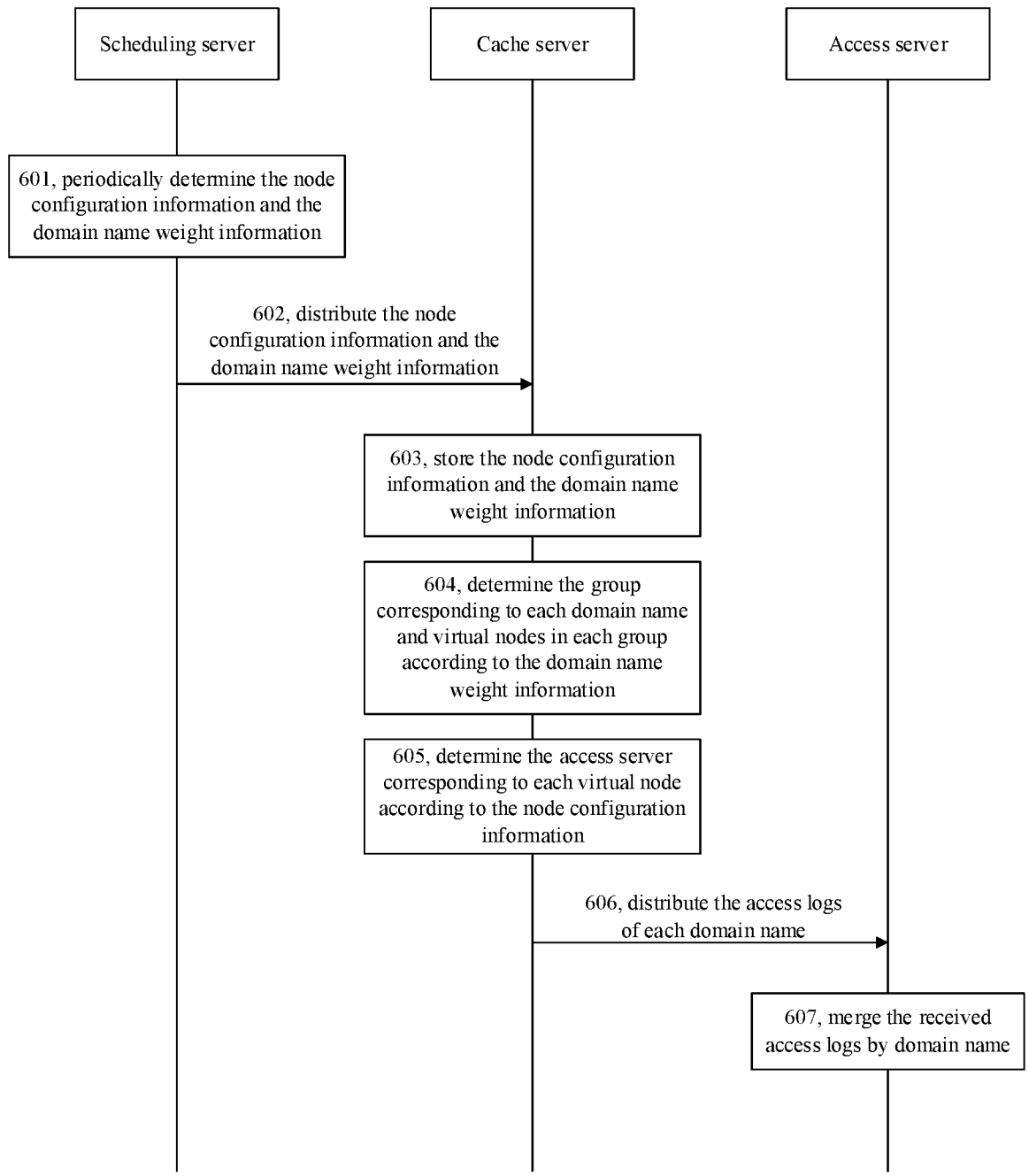
FIG. 6 is a schematic flowchart of interactive processing between various servers according to the present disclosure.

Based on the system architecture of FIG. 1, an embodiment of the present disclosure provides interactive processing of access logs, as shown in FIG. 6.

In step 601, the scheduling server periodically determines the node configuration information and the domain name weight information. Since the processing capability of the access server changes in real time, the node configuration information may be adjusted periodically, so that each access server may better provide log analysis function. Meanwhile, the domain name weight information may also change, for example, when the domain name weight information is determined based on the number of historical access logs, thus the domain name weight information of each domain name also needs to be adjusted periodically.

In step 602, the scheduling server distributes the node configuration information and the domain name weight information to each cache server.

In step 603, each cache server stores the node configuration information and the domain name weight information.

In step 604, each cache server determines the group corresponding to each domain name and virtual nodes in each group according to the domain name weight information.

In step 605, each cache server determines the access server corresponding to each virtual node according to the node configuration information.

In step 606, each cache server distributes the access logs of each domain name to the corresponding access server.

In step 607, each access server merges the received access logs by domain name.

In the aforementioned implementation process, the domain name weight of each domain name is different, which results in different grouping of the domain names; meanwhile it may occur that one virtual node corresponds to the access logs of virous domain names; nevertheless, each domain name is managed in accordance with the same rule. Therefore, a unified processing rule may be implemented for the access logs of each domain name to facilitate orderly conduct of the entire system.

Figure 7:
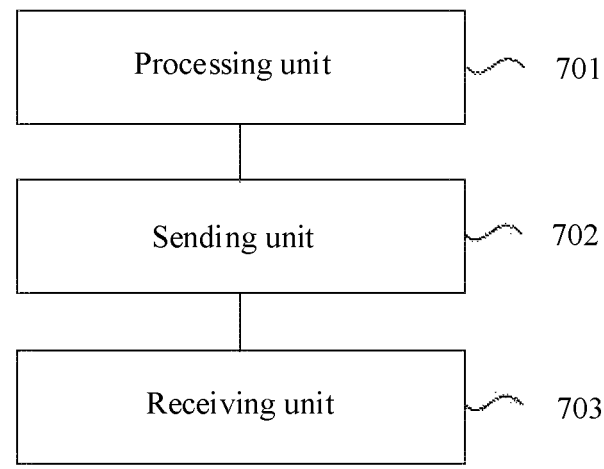
FIG. 7 is a structural diagram of an access log processing device according to the present disclosure.

Based on the same inventive concept, FIG. 7 exemplarily shows a structure of an access log processing device provided by the embodiments of the present disclosure. The device may be located in a cache server and is configured to execute the process of the access log processing method.

A processing unit 701 is configured to divide the virtual nodes to which each access server is mapped into groups according to domain name weight information of a first domain name. The first domain name is any one of a plurality of domain names.

The processing unit 701 is further configured to determine a first virtual node corresponding to the first domain name in each group.

The processing unit 701 is further configured to determine a first access server corresponding to each first virtual node according to node configuration information. The node configuration information is configured to indicate correspondence between virtual nodes and access servers.

A sending unit 702 is configured to send access logs of the first domain name to the first access server.

In one embodiment, the processing unit 701 is further configured to determine a second virtual node when determining that the first access server is highly loaded, and distribute a part of the access logs of the first domain name to the second access server corresponding to the second virtual node. The second virtual node is a neighboring node of the group in which the first virtual node is located.

In one embodiment, the processing unit 701 is further configured to determine a second virtual node when determining that the first access server fails, and distribute the access logs of the first domain name to the second access server corresponding to the second virtual node. The second virtual node is a neighboring node of the group in which the first virtual node is located.

In one embodiment, the device further includes a receiving unit 703 configured to receive the node configuration information and the domain name weight information sent from the scheduling server. The node configuration information is created by the scheduling server according to a consistent hash ring. The virtual nodes in the consistent hash ring are determined according to processing capability of each access server.

In one embodiment, the domain name weight information is determined according to the number of the historical access logs of each domain name. The number of the first virtual nodes is proportional to the domain name weight information.

Figure 8:
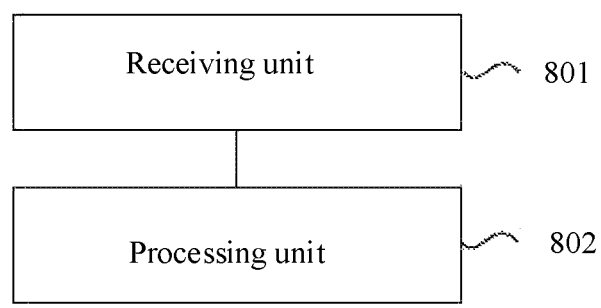
FIG. 8 is a structural diagram of an access log processing device according to the present disclosure.

Based on the same inventive concept, FIG. 8 exemplarily shows a structure of an access log processing device provided by the embodiments of the present disclosure. The device may be located in an access server and is configured to execute the process of the access log processing method.

A receiving unit 801 is configured to receive access logs of a first domain name sent from a cache server. The receiving unit is determined by the cache server according to domain name weight information of the first domain name and node configuration information. The domain name weight information is determined according to the number of the historical access logs of each domain name. The node configuration information is configured to indicate the correspondence between the virtual nodes and the access servers.

A processing unit 802 is configured to process the received access logs of the first domain name and send the processed access logs.

In one embodiment, the processing unit 802 is configured to merge the received access logs of the first domain name into one log by domain name and send the merged log.

Based on the same inventive concept, the embodiments of the present disclosure further provide a computing device, including:

a memory configured to store program instructions;

a processor configured to call the program instructions stored in the memory, and execute the aforementioned access log processing method according to the program instructions.

Based on the same inventive concept, the embodiments of the present disclosure further provide a computer-readable non-volatile storage medium, including computer-readable instructions, and the computer-readable instructions, when read and executed by a computer, cause the computer to implement the aforementioned access log processing method.

The present disclosure is described with reference to flowcharts and/or block diagrams of methods, devices (systems), and computer program products according to the embodiments of the present disclosure. It should be understood that each process and/or block in the flowcharts and/or block diagrams, and combinations of processes and/or blocks in the flowcharts and/or block diagrams may be implemented by computer program instructions. These computer program instructions may be provided to the processor of a general-purpose computer, special-purpose computer, embedded processor, or other programmable data processing device to produce a machine, so that the instructions executed by the processor of a computer or other programmable data processing device generate an device for realizing the functions specified in one or more processes of the flowcharts and/or one or more blocks of the block diagrams.

These computer program instructions may also be stored in a computer-readable memory capable of directing a computer or other programmable data processing device to work in a particular manner so that the instructions stored in the computer-readable memory produce a manufactured article including the instruction device. The instruction device implements the functions specified in one or more processes of the flowcharts and/or one or more blocks of the block diagrams.

These computer program instructions may also be loaded onto a computer or other programmable data processing device, so that a series of operational steps are performed on the computer or other programmable device to produce a computer-implemented process, and thereby the instructions executed on the computer or other programmable device provide steps for implementing the functions specified in one or more processes of the flowcharts and/or one or more blocks of the block diagrams.

Although the preferred embodiments of the present disclosure have been described, those skilled in the art may make additional changes and modifications to these embodiments once they know the basic inventive concepts. Therefore, the following claims are intended to be construed to include the preferred embodiments and all changes and modifications that fall within the scope of the present disclosure.

Obviously, those skilled in the art may make various changes, modifications and variations to the present disclosure without departing from the spirit and scope of the present disclosure. In this way, if the present disclosure also intends to include changes, these modifications and variations falling within the scope of the claims of the present disclosure and their equivalent technologies.

What is claimed is:

1. An access log processing method, comprising:
    dividing, by a cache server, virtual nodes to which each access server is mapped into groups according to domain name weight information of a first domain name;
    determining, by the cache server, a first virtual node corresponding to the first domain name in each group;
    determining, by the cache server, a first access server corresponding to each first virtual node according to node configuration information, the node configuration information being configured to indicate correspondence between virtual nodes and access servers; and
    sending, by the cache server, access logs of the first domain name to the first access server.

2. The method according to claim 1, wherein the method further comprises:
    in response to the cache server determining that the first access server is highly loaded: determining, by the cache server, a second virtual node, the second virtual node and the first virtual node belonging to the same group and being adjacent to each other; and
    distributing, by the cache server, a part of the access logs of the first domain name to a second access server corresponding to the second virtual node.

3. The method according to claim 1, wherein the method further comprises:
    in response to the cache server determining that the first access server fails: determining, by the cache server, a second virtual node, the second virtual node and the first virtual node belonging to the same group and being adjacent to each other; and
    distributing, by the cache server, the access logs of the first domain name to a second access server corresponding to the second virtual node.

4. The method according to claim 1, wherein before dividing the virtual nodes to which each access server is mapped into groups, the method further comprises:
    receiving, by the cache server, the node configuration information and the domain name weight information sent from a scheduling server, the node configuration information being created by the scheduling server according to a consistent hash ring; and
    the virtual nodes in the consistent hash ring being determined according to processing capability of each access server.

5. The method according to claim 1, wherein the determining, by the cache server, a first virtual node corresponding to the first domain name in each group comprises:
    determining a number of the virtual nodes included in each group according to a total number of the virtual nodes and a number of the groups; and
    performing hash calculation on the first domain name according to the number of the virtual nodes included in each group to obtain a location of the first virtual node corresponding to the first domain name in each group.

6. The method according to claim 1, wherein the domain name weight information is determined according to a number of historical access logs of each domain name or priority of each domain name; the number of the first virtual nodes is proportional to the domain name weight information.

7. An access log processing method, comprising:
    receiving, by a first access server, access logs of a first domain name sent from a cache server, the first access server being determined by the cache server according to domain name weight information of the first domain name and node configuration information, the node configuration information being configured to indicate correspondence between virtual nodes and access servers; and
    processing, by the first access server, the received access logs of the first domain name and sending the processed access logs.

8. The method according to claim 7, wherein the processing, by the first access server, the received access logs of the first domain name and sending the processed access logs comprises:
    merging, by the first access server, the received access logs of the first domain name into one log according to the domain name and sending the merged log.

9. The method according to claim 7, wherein the domain name weight information is determined according to a number of historical access logs of each domain name or priority of each domain name.

10. An access log processing device, comprising:
    a processor; and,
    a memory storing instructions executable by the processor;
    wherein the instructions, when executed by the processor, cause the processor to implement an access log processing method; and
    wherein the method comprises:
    dividing, by a cache server, virtual nodes to which each access server is mapped into groups according to domain name weight information of a first domain name;
    determining, by the cache server, a first virtual node corresponding to the first domain name in each group;
    determining, by the cache server, a first access server corresponding to each first virtual node according to node configuration information, the node configuration information being configured to indicate correspondence between virtual nodes and access servers; and sending, by the cache server, access logs of the first domain name to the first access server.

11. The device according to claim 10, wherein the method further comprises:

in response to the cache server determining that the first access server is highly loaded: determining, by the cache server, a second virtual node, the second virtual node and the first virtual node belonging to the same group and being adjacent to each other; and distributing, by the cache server, a part of the access logs of the first domain name to a second access server corresponding to the second virtual node.

12. The device according to claim 10, wherein the method further comprises:

in response to the cache server determining that the first access server fails: determining, by the cache server, a second virtual node, the second virtual node and the first virtual node belonging to the same group and being adjacent to each other; and distributing, by the cache server, the access logs of the first domain name to a second access server corresponding to the second virtual node.

13. The device according to claim 10, wherein before dividing the virtual nodes to which each access server is mapped into groups, the method further comprises:

receiving, by the cache server, the node configuration information and the domain name weight information sent from a scheduling server, the node configuration information being created by the scheduling server according to a consistent hash ring; and the virtual nodes in the consistent hash ring being determined according to processing capability of each access server.

14. The device according to claim 10, wherein the determining, by the cache server, a first virtual node corresponding to the first domain name in each group comprises:

determining a number of the virtual nodes included in each group according to a total number of the virtual nodes and a number of the groups; and performing hash calculation on the first domain name according to the number of the virtual nodes included in each group to obtain a location of the first virtual node corresponding to the first domain name in each group.

15. The device according to claim 10, wherein the domain name weight information is determined according to a number of historical access logs of each domain name, and the number of the first virtual nodes is proportional to the domain name weight information.

* * * * *